United States Patent
Tanisaki (10) Patent No.: US 9,986,130 B2
(45) Date of Patent: May 29, 2018

(54) IMAGE READING APPARATUS THAT ENSURES HIGH SN RATIO BY SUFFICIENT USE OF PERFORMANCE OF IMAGE SENSOR, IMAGE READING METHOD, AND RECORDING MEDIUM THEREFOR

(71) Applicant: Kyocera Document Solutions Inc., Osaka (JP)

(72) Inventor: Yukio Tanisaki, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 1 day.

(21) Appl. No.: 15/404,805

(22) Filed: Jan. 12, 2017

(65) Prior Publication Data

US 2017/0208210 A1    Jul. 20, 2017

(30) Foreign Application Priority Data

Jan. 19, 2016  (JP) ................ 2016-008355

(51) Int. Cl.
| | |
|---|---|
| H04N 1/401 | (2006.01) |
| H04N 1/40 | (2006.01) |
| H04N 1/028 | (2006.01) |
| H04N 1/03 | (2006.01) |
| H04N 1/193 | (2006.01) |
| H04N 1/00 | (2006.01) |

(52) U.S. Cl.
CPC ......... *H04N 1/401* (2013.01); *H04N 1/00013* (2013.01); *H04N 1/00039* (2013.01); *H04N 1/00045* (2013.01); *H04N 1/00082* (2013.01); *H04N 1/02815* (2013.01); *H04N 1/02865* (2013.01); *H04N 1/03* (2013.01); *H04N 1/193* (2013.01); *H04N 1/40056* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 4,584,609 | A * | 4/1986 | Klein | H04N 5/37213 348/322 |
| 4,623,927 | A * | 11/1986 | Hoshino | H04N 5/3692 348/298 |

(Continued)

FOREIGN PATENT DOCUMENTS

JP    H10-257249 A    9/1998

*Primary Examiner* — Scott A Rogers
(74) *Attorney, Agent, or Firm* — James W. Judge (57) ABSTRACT

An image reading apparatus includes a light source, a light-source control unit, a line sensor, an image data generating unit, and an image analysis unit. The line sensor includes a plurality of light receiving elements, a plurality of charge coupled devices, and a shift register. The image data generating unit generates image data according to electric charges output from the shift register. The image analysis unit determines whether transfer of the electric charges is normal, based on a contour reproduction status, being the status of reproduction of contours in test image data generated by reading of a test image having contours oriented intersecting an orientation whereby the plurality of light receiving elements are arranged. The light-source control unit adjusts the amount of light from the light source based on the determination by the image analysis unit.

10 Claims, 8 Drawing Sheets

(56) References Cited

U.S. PATENT DOCUMENTS

| | | | | |
|---|---|---|---|---|
| 4,672,453 A | * | 6/1987 | Sakamoto | H04N 1/40056 |
| | | | | 348/311 |
| 5,479,207 A | * | 12/1995 | Degi | H04N 1/40056 |
| | | | | 348/297 |
| 5,661,521 A | * | 8/1997 | Curtis | H04N 5/2175 |
| | | | | 348/249 |
| 5,777,671 A | * | 7/1998 | Maki | H04N 5/361 |
| | | | | 348/303 |
| 7,783,614 B2 | * | 8/2010 | Jones | G06F 17/2229 |
| | | | | 707/694 |
| 9,386,241 B2 | * | 7/2016 | Kueny | H04N 5/355 |

* cited by examiner

Initial Value +5%

FIG. 5B

Initial Value +10%

FIG. 6

Initial Value +15%

For detection of contour extending in sub-scanning direction $$\begin{pmatrix} -1 & 0 & 1 \\ -2 & 0 & 2 \\ -1 & 0 & 1 \end{pmatrix}$$

Main-Scanning Direction

Sub-Scanning Direction

FIG. 8B

For detection of contour extending in upper right direction $$\begin{pmatrix} 2 & 1 & 0 \\ 1 & 0 & -1 \\ 0 & -1 & -2 \end{pmatrix}$$

FIG. 8C

For detection of contour extending in lower right direction $$\begin{pmatrix} 0 & 1 & 2 \\ -1 & 0 & 1 \\ -2 & -1 & 0 \end{pmatrix}$$

IMAGE READING APPARATUS THAT ENSURES HIGH SN RATIO BY SUFFICIENT USE OF PERFORMANCE OF IMAGE SENSOR, IMAGE READING METHOD, AND RECORDING MEDIUM THEREFOR

INCORPORATION BY REFERENCE

This application is based upon, and claims the benefit of priority from, corresponding Japanese Patent Application No. 2016-008355 filed in the Japan Patent Office on Jan. 19, 2016, the entire contents of which are incorporated herein by reference.

BACKGROUND

Unless otherwise indicated herein, the description in this section is not prior art to the claims in this application and is not admitted to be prior art by inclusion in this section.

A typical image reading apparatus typically generates an analog-image signal by causing light to perform sub-scanning with respect to a document and reading the document by a line sensor with a plurality of light receiving elements arranged in a main-scanning direction. Some line sensors include charge coupled devices (CCDs) in parallel (the main-scanning direction in this example) with respect to the plurality of light receiving elements, and those sensors are referred to as "CCD line sensor" in this description. The CCD line sensor accumulates electric charges that are photoelectrically converted by the plurality of light receiving elements in each potential well (a well of an electric charge) formed by a CCD element according to each pixel. The electric charges accumulated in each potential well are transferred all at once in a sub-scanning direction with respect to a shift register arranged in the main-scanning direction (what is called a bucket brigade).

A light amount of a light source in image reading by a CCD line sensor has been set as a result of the following trade-off. (1) A large amount of electric charges accumulated in each potential well enables increasing an SN ratio. (2) A large amount of electric charges causes a phenomenon (smear) where electric charges leak in a direction perpendicular to a transfer direction in transferring of the electric charges. Considering such trade-off, there is proposed a technique that determines a temporal variation pattern of a light amount from a light source and then adjusts a light-amount level value of the light source based on the determined variation pattern. This technique discloses that it is possible to obtain an image with a favorable SN ratio at high speed by setting a light-amount level to an optimum value in light-amount adjustment such as power activation.

SUMMARY

An image reading apparatus according to one aspect of the disclosure reads an image on a document. The image reading apparatus includes a light source, a light-source control unit, a line sensor, an image data generating unit, and an image analysis unit. The light source irradiates the document with light. The light-source control unit controls amount of light from the light source. The line sensor includes a plurality of light receiving elements, a plurality of charge coupled devices, and a shift register. The plurality of light receiving elements generate electric charges on receiving reflected light reflected from the light on the document. The plurality of charge coupled devices accumulating respective electric charges generated by the plurality of light receiving elements. The shift register receives electric charges transferred from the plurality of charge coupled devices. The image data generating unit generates image data according to electric charges output from the shift register. The image analysis unit determines whether transfer of the electric charges is normal, based on a contour reproduction status, being the status of reproduction of contours in test image data generated by reading of a test image having contours oriented intersecting an orientation whereby the plurality of light receiving elements are arranged. The light-source control unit adjusts the amount of light from the light source based on the determination by the image analysis unit.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes a configuration for implementing the disclosure (hereinafter referred to as "embodiment") with reference to the drawings.

Figure 1:
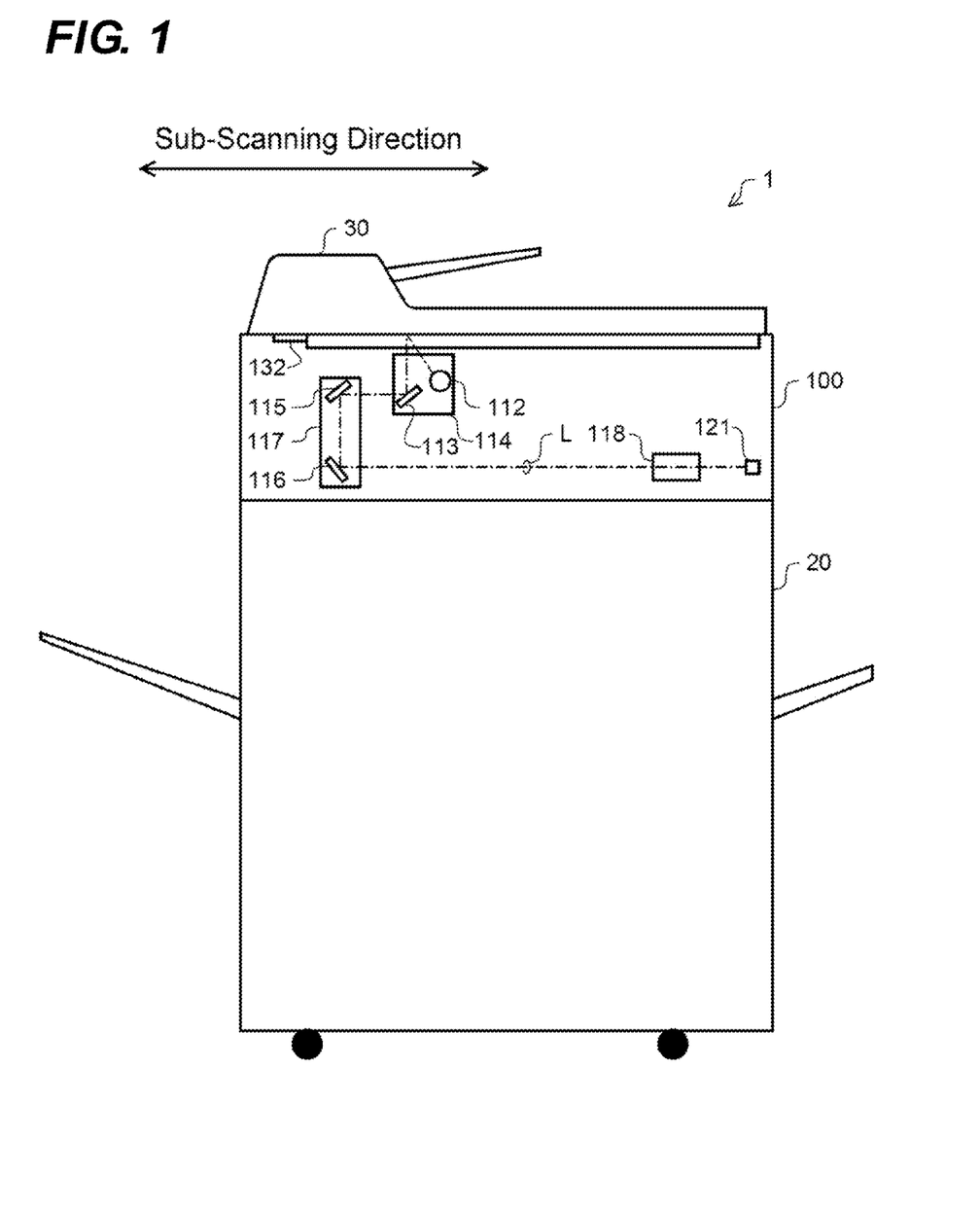
FIG. 1 schematically illustrates an overall configuration of an image forming apparatus according to one embodiment of the disclosure.
Figure 2:
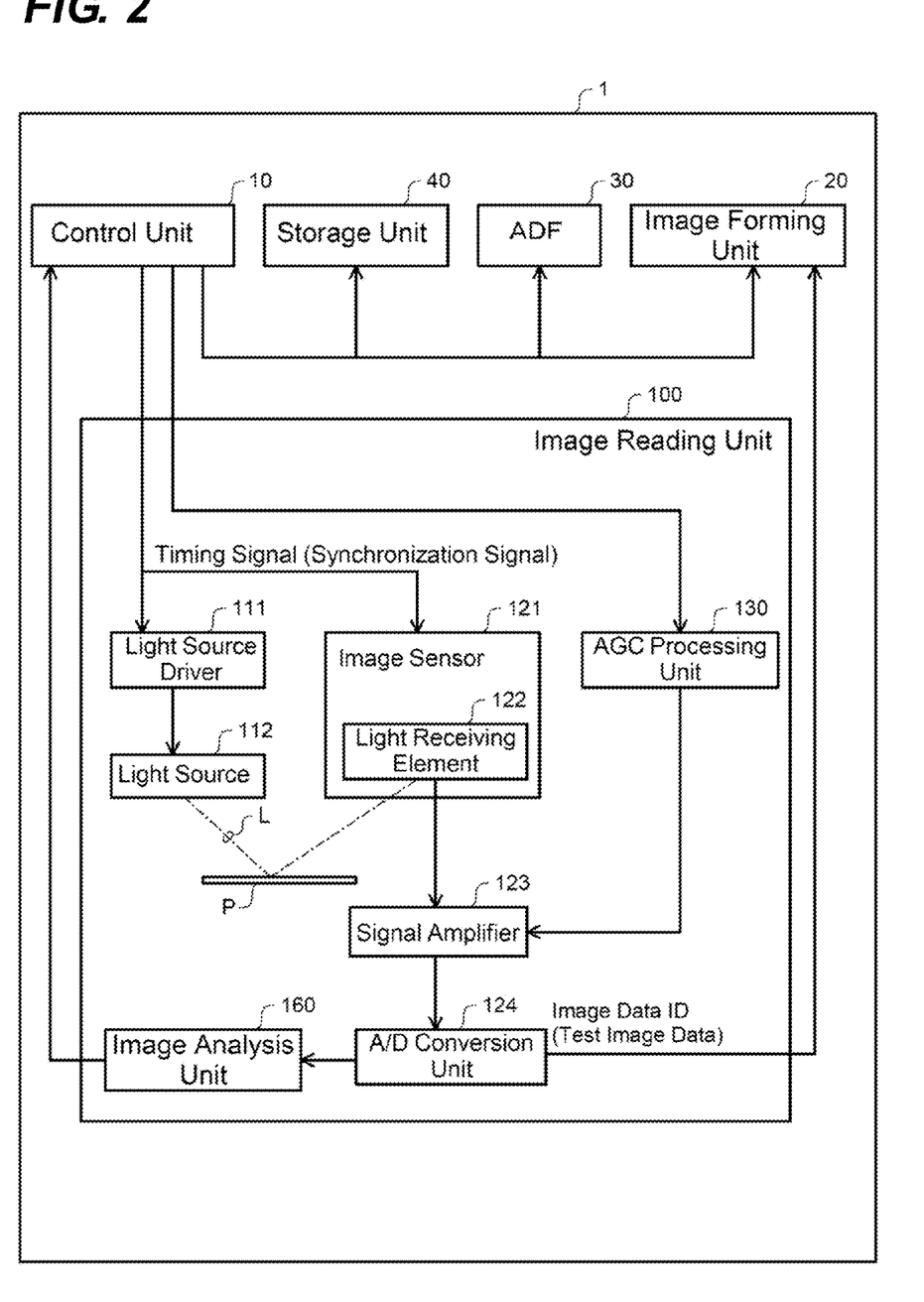
FIG. 2 illustrates an overall configuration of the image forming apparatus according to the one embodiment.

FIG. 1 schematically illustrates an overall configuration of an image forming apparatus 1 according to one embodiment of the disclosure. FIG. 2 illustrates an overall configuration of the image forming apparatus 1 according to the one embodiment. The image forming apparatus 1 includes a control unit 10, an image reading unit 100, an image forming unit 20, an automatic document feeder (ADF) 30, and a storage unit 40. The image reading unit 100 reads an image from a document to generate an image data ID as digital data. The image forming unit 20 forms an image on a print medium P based on the image data ID and then discharges.

The control unit 10 includes a main storage unit such as a RAM and a ROM and a control unit such as a microprocessing unit (MPU) and a central processing unit (CPU). The control unit 10 includes a controller function related to an interface such as various kinds of I/O, a universal serial bus (USB), a bus, and other hardware, and controls the entire image forming apparatus 1.

The storage unit 40 is a storage device including a hard disk drive, which is a non-transitory recording medium, a flash memory, and similar memory, and stores control programs and data of processes executed by the control unit 10.

The image reading unit 100 includes a light source driver 111, a light source 112, and an image analysis unit 160. The light source 112 has a plurality of LEDs (not illustrated) that irradiate the print medium P with light. The light source driver 111 is a LED driver that drives the plurality of LEDs arranged in a main-scanning direction and performs on/off drive control for the light source 112. This enables the light source 112 to irradiate the print medium P with pulse-width modulation (PWM) of variable driving duty. The control unit 10 and the light source driver 111 serve as a light-source control unit. The function of the image analysis unit 160 will be described later.

The image reading unit 100 further includes a first reflecting mirror 113, a first carriage 114, a second reflecting mirror 115, a third reflecting mirror 116, a second carriage 117, a condensing lens 118, and an image sensor 121. The first reflecting mirror 113 reflects a reflected light L from the print medium P to the direction of the second reflecting mirror 115. The second reflecting mirror 115 reflects the reflected light L to the direction of the third reflecting mirror 116. The third reflecting mirror 116 reflects the reflected light L to the direction of the condensing lens 118. The condensing lens 118 forms an image with the reflected light L on a light receiving surface of a light receiving element 122 included in the image sensor 121.

The image sensor 121 is a line sensor that includes a plurality of light receiving elements 122 arranged in the main-scanning direction. The plurality of light receiving elements 122 generate a photoelectrically converted electric charge according to the intensity of each incident light and accumulate the electric charge in each potential well (a well of an electric charge) formed by a CCD element that corresponds to each pixel. The electric charge accumulated in each potential well is transferred to a shift register (not illustrated) all at once. Each electric charge transferred to the shift register is converted to an analog electrical signal, which is a voltage signal, by a charge-voltage conversion amplifier. This enables the image sensor 121 to output the analog electrical signal for each pixel in the main-scanning direction.

The first carriage 114 includes the light source 112 and the first reflecting mirror 113 and reciprocates in a sub-scanning direction. The second carriage 117 includes the second reflecting mirror 115 and the third reflecting mirror 116 and reciprocates in the sub-scanning direction. The first carriage 114 and the second carriage 117 are controlled by the control unit 10 that serves as a scanning control unit and are driven so as to achieve any of a plurality of sub-scanning speeds (described below) that are preliminarily set. This enables the light source 112 to scan a document in the sub-scanning direction, and thus enables the image sensor 121 to output the analog electrical signal according to a two-dimensional image on the document.

When the automatic document feeder (ADF) 30 is used, the first carriage 114 and the second carriage 117 are secured to a predetermined sub-scanning position, and a scan in the sub-scanning direction is performed by an automatic feed of the print medium P. The scanning speed in this case differs from the scanning speed of the scan by the reciprocation motion of the first carriage 114 and the second carriage 117 because of mechanism.

The image reading unit 100 further includes a signal amplifier 123, an A/D conversion unit 124, an AGC processing unit 130, and a white reference plate 132 (see FIG. 1). The signal amplifier 123 is a variable gain amplifier. The signal amplifier 123 amplifies the analog electrical signal with a gain that is set by the AGC processing unit 130 and stored in the storage unit 40. The A/D conversion unit 124 performs A/D conversion of the amplified analog electrical signal to generate the image data ID as digital data. The image forming unit 20, as described above, forms an image on the print medium P based on the image data ID and then discharges. The image data ID is data having a range width of a minimum value "0" and a maximum value "255." The signal amplifier 123 and the A/D conversion unit 124 function as an image data generating unit.

The AGC processing unit 130, in the embodiment, is a gain adjustment unit that sets an optimum gain and an optimum offset value with respect to each of the plurality of light receiving elements 122 with use of a black reference signal and a white reference signal. The black reference signal is the analog electrical signal of the light receiving element 122 when the light source 112 is in a status of OFF. The white reference signal is the analog electrical signal of the light receiving element 122 when the white reference plate 132 is irradiated instead of the print medium P. The AGC processing unit 130 sets the offset value such that the value of the image data ID becomes the minimum value "0" when the A/D conversion unit 124 performs A/D conversion on the black reference signal. The AGC processing unit 130 sets the gain such that the value of the image data ID becomes the maximum value "255" with use of the offset value when the A/D conversion unit 124 performs A/D conversion on the white reference signal.

This enables effective use of the width of the image data ID from the minimum value "0" to the maximum value "255" with respect to the variation of the analog electrical signal caused by the increase and decrease of the reflected light between the black reference signal and the white reference signal. In the embodiment, the control unit 10 stores the gain according to each of the light receiving elements 122 in the storage unit 40.

However, in order to obtain the white reference signal, the first carriage 114 and the second carriage 117 are secured to the position according to the white reference plate 132, and the light source 112 irradiates the white reference plate 132 with the light. Here, in a conventional image reading apparatus, the light amount of the light source 112 has been equally set such that it falls within a range of the largest saturated output voltage permitted as the specification of the image sensor 121.

However, the inventor of the present application has found out that, as a technical property of a CCD, while the largest saturated output voltage significantly differs by the image sensor 121 and has a large individual difference (variation), the individual difference of the plurality of CCD elements inside the image sensor 121 is small. The disclosure is created based on such new knowledge.

Figure 3:
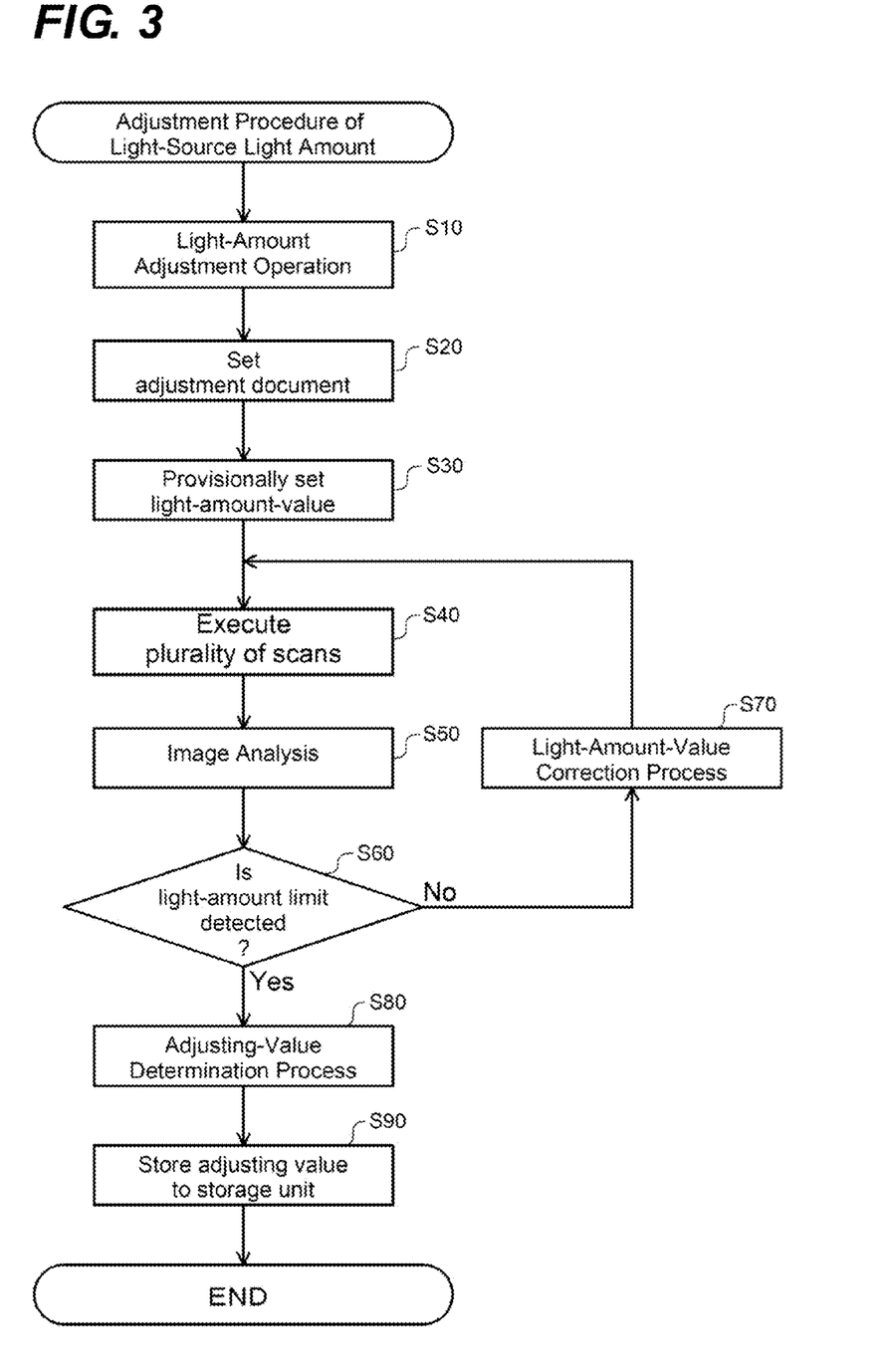
FIG. 3 illustrates a content of an adjustment process of a light amount of a light source according to the one embodiment.

FIG. 3 illustrates a content of an adjustment process of the light amount of the light source 112 according to one embodiment. At Step S10, a user executes a light-amount adjustment operation. The light-amount adjustment operation is an operation that operates the image forming apparatus 1 to cause a light-amount adjustment process to start. The light-amount adjustment process is a process that increases the light amount of the light source 112 in a range that does not cause the CCD saturation of the image sensor 121, which uses the light amount of the light source 112, to improve its SN ratio.

At Step S20, the user sets an adjustment document, which is preliminarily prepared, to the image reading unit 100. At Step S30, the image reading unit 100 executes a light-amount-provisional-setting process. The light-amount-provisional-setting process is a process that sets a light amount for test (hereinafter also referred to as "test light amount"). Specifically, the test light amount is set to the light amount where a predetermined value is added to an initial value that is within a range of the largest saturated output voltage permitted as the specification of the image sensor 121. The specification of the image sensor 121 is set on the safe side in consideration of the individual difference of the image sensor 121. In the image reading unit 100, a light amount where a predetermined value is added to the previous set value (currently used value) may be set as the test light amount during operation.

Figure 4A:
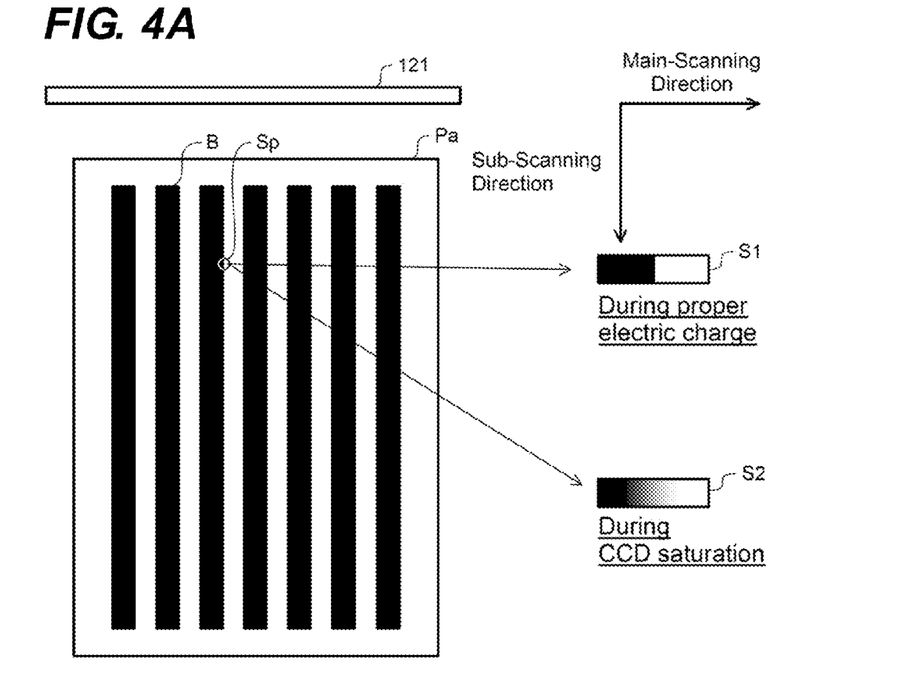
FIGS. 4A to 4B illustrate an adjustment document used for the adjustment process of the light amount of the light source and a reading result according to the one embodiment.

FIGS. 4A to 4B illustrate an adjustment document Pa used for the adjustment process of the light amount of the light source 112 and a reading result according to the one embodiment. FIG. 4A illustrates the preliminarily prepared adjustment document Pa. The adjustment document Pa includes a test image where seven black bands B are arranged at intervals in the main-scanning direction. These seven black bands B are read by the image sensor 121 that performs scanning in the sub-scanning direction. The image sensor 121 is a line sensor with the plurality of CCD elements (not illustrated) arranged in the main-scanning direction. The image reading unit 100 reads the seven black bands B formed on the adjustment document Pa by scanning the image sensor 121 in the sub-scanning direction to enable generation of test image data Da.

At Step S40, the user presses a start button. In the embodiment, the control unit 10 of the image reading unit 100 controls the light source driver 111 to irradiate the light from the light source 112 with test light amounts of the initial value +5%, the initial value +10%, and the initial value +15% to execute scanning three times. By executing image reading three times, the image reading unit 100 generates three sets of the test image data Da (Da1 to Da3).

Figure 5A:
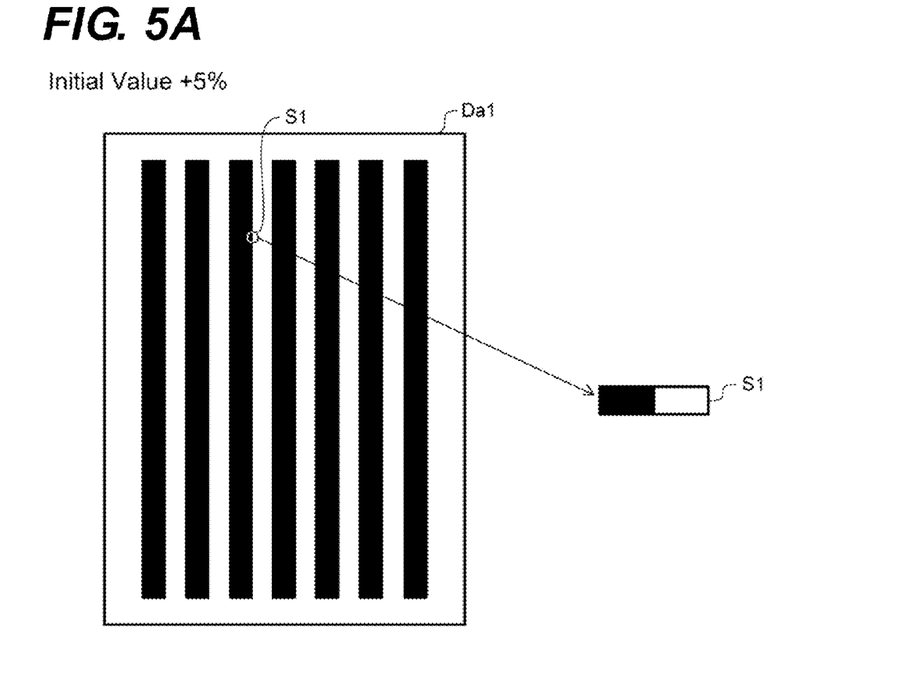
FIGS. 5A to 5B illustrate test image data generated by reading the adjustment document according to the one embodiment.
Figure 5B:
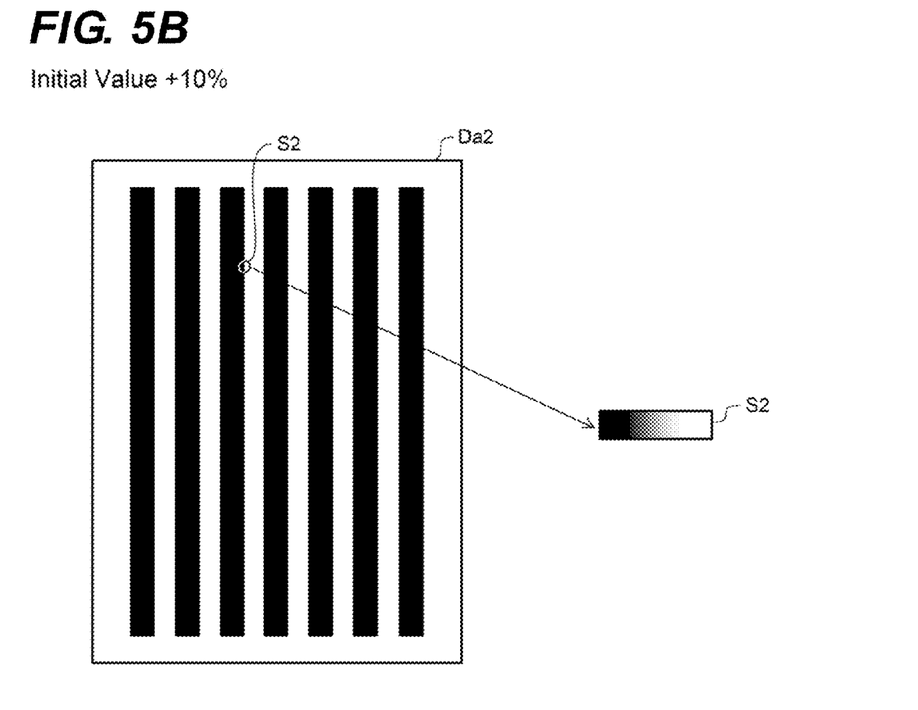
Figure 6:
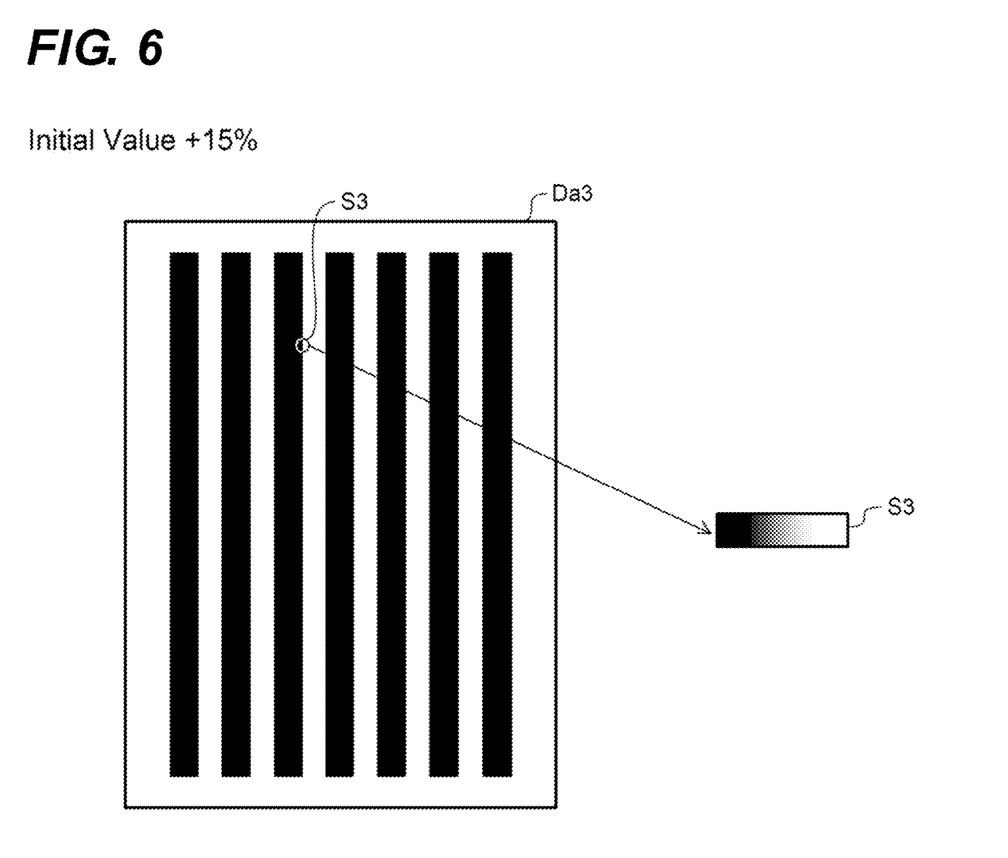
FIG. 6 illustrates test image data generated by reading the adjustment document according to the one embodiment.

FIGS. 5A to 6 illustrate the test image data Da (Da1 to Da3) generated by reading the adjustment document Pa according to the one embodiment. The test image data Da1 is test image data obtained by irradiating the light with the test light amount of the initial value +5%. The test image data Da2 is test image data obtained by irradiating the light with the test light amount of the initial value +10%. The test image data Da3 is test image data obtained by irradiating the light with the test light amount of the initial value +15%.

At Step S50, the image analysis unit 160 performs an image analysis. The image analysis is executed to detect an overflow of the electric charge in the plurality of CCD elements arranged in the main-scanning direction. It is possible to perform the image analysis, for example, based on the pixel in a sample region Sp (boundary region of black and white) in the contour region of the black band B. The contour region is constituted of a plurality of pixels (four pixels in this example) arranged in the main-scanning direction.

Specifically, a sample S1 is indicated as a pixel status during proper electric charge, namely, when the overflow of the electric charge does not occur. During proper electric charge, since the overflow of the electric charge does not occur, the contour region of the black band B is accurately read, and the sample S1 is in a contour reproduction status where the contour is clearly reproduced. On the other hand, a sample S2 is indicated as a pixel status during CCD saturation, namely, when the overflow of the electric charge occurs. During CCD saturation, since the overflow of the electric charge occurs, the contour region of the black band B is not accurately read, and the sample S2 is in a contour reproduction status where the reproduction of the contour is not clear.

Figure 4B:
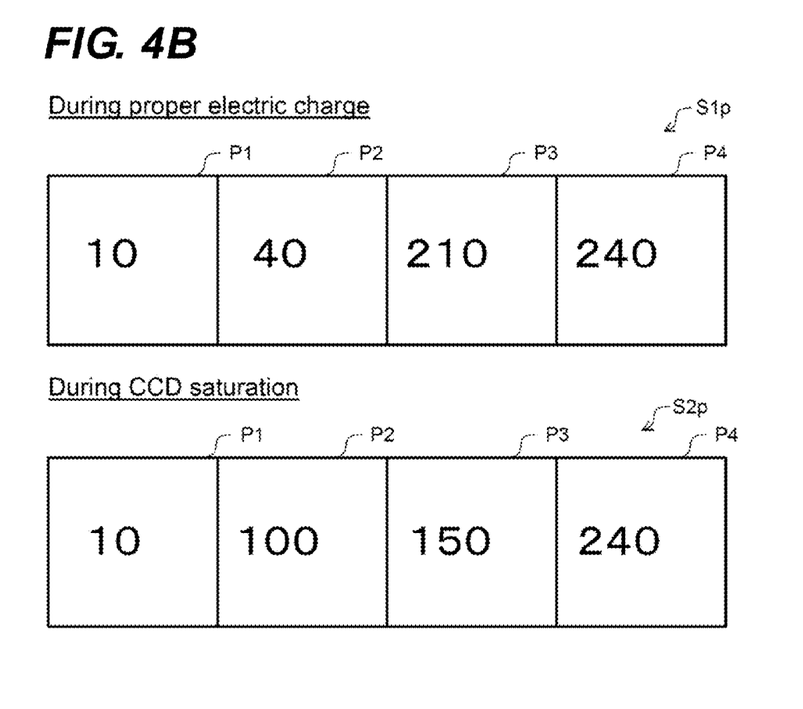

FIG. 4B illustrates pixel values of a sample S1p during proper electric charge and a sample S2p during CCD saturation. The two samples S1p and S2p are the contour region (sample region Sp) of the black band B constituted of four pixels P1 to P4. In this example, it is assumed as a conceptual example that the contour of the black band B is arranged in the proximity of the boundary of the pixel P2 and the pixel P3. The two pixels P1 and P2 are the pixel values read from the black band B. The two pixels P3 and P4 are the pixel values read from the background (white portion) of the adjustment document Pa.

In any of the samples S1p and S2p, the pixel P1 has a pixel value 10 where the electric charge, which is read from the black band B and is accumulated, is accurately reproduced, and the pixel P4 has a pixel value 240 where the electric charge, which is read from the background and is accumulated, is accurately reproduced. In the sample S1p, the pixels P2 and P3 have the pixel values 40 and 210, respectively, due to the blurring of the contour of the black band B and the displacement from the boundary between the pixel P2 and the pixel P3. This creates the difference in the pixel value between the two pixels P2 and P3 of 170 to clearly reproduce the contour.

In contrast to this, in the sample S2p, the electric charge, which is excessively accumulated to the CCD element according to the pixel P3, overflows to the pixel P2 neighboring in the main-scanning direction when transferred to the shift register in the sub-scanning direction. This results in that the pixels P2 and P3 have the pixel values 100 and 150, respectively. This decreases the difference in the pixel value between the two pixels P2 and P3 to 50, and thus the contour is reproduced in a blurry status.

At Step S60, the image analysis unit 160 executes a light-amount-limit detection process. The light-amount-limit detection process is a process that detects the light amount of the light source at a start of the CCD saturation of the image sensor 121. The light-amount-limit detection process may perform processing using a pixel value of at least one sample region (for example, the sample region Sp), which is preliminarily set, as described above, or may perform processing in a batch using a contour extraction filter as described below.

The light-amount-limit detection process uses a contour detection process. In the contour detection process, the image analysis unit 160 processes the test image data Da using, for example, a differential filter. With this process, the difference of the pixel value of the pixel neighboring in the main-scanning direction becomes a contour pixel value. This detects the contour of the black band B in the sub-scanning direction as a linear region with a high contour pixel value.

Specifically, the image analysis unit 160 detects a predetermined contour as the linear region where, for example, the contour pixel value becomes equal to or more than 120 (referred to as "predetermined value") as a threshold value. This enables to determine that the light amount of the light source 112 is not excessive when, for example, the contour pixel value becomes equal to or more than 120, and the contour of the black band B in the sub-scanning direction is in a reproduction status accurately reproduced as the linear region.

The image analysis unit 160 uses the light amounts of the initial value +5%, the initial value +10%, and the initial value +15% as the test light amount as described above. In this embodiment, adjustment of the driving duty of the light source 112 by the light source driver 111 ensures these light amounts.

When the transfer of the electric charge is normal in any of the test light amount (NO at Step S60), the image analysis unit 160 further increases the test light amount by 10% and then returns the process to Step S40 (Step S70). In this manner, until the test light amount where the transfer of the electric charge is not normal is detected at Step S60, namely, a light-amount limit is detected, Steps S40 to S70 are repeated. When the transfer of the electric charge is not normal among any of the test light amounts of the initial value +5%, the initial value +10%, and the initial value +15%, the image analysis unit 160 does not execute the process of Step S70. Then, when the light-amount limit is detected at Step S60 (YES at Step S60), the image analysis unit 160 causes the process to proceed to Step S80.

At Step S80, the image analysis unit 160 executes an adjusting-value determination process. The adjusting-value determination process enables determining the test light amount detected, for example, as the light-amount limit as an adjusting value. Specifically, among the test light amounts used for generation of at least one piece of test image data Da determined that the transfer of the electric charge is normal, the image analysis unit 160 determines the light amount that is closest to the test light amount used for generation of the test image data Da determined that the transfer of the electric charge is not normal, as the adjusting value. In other words, the image analysis unit 160 determines the largest light amount among the test light amounts determined that the transfer of the electric charge is normal as the adjusting value. For example, when the transfer of the electric charge is normal for the test light amounts of the initial value +5% and the initial value +10%, and the transfer of the electric charge is not normal for the test light amount of the initial value +15%, the image analysis unit 160 determines the test light amount of the initial value +10% as the adjusting value. The above-described light amount of the largest light amount is not necessarily required to be directly set as the adjusting value; the above-described largest light amount may be slightly increased or decreased to be used.

At Step S90, the image analysis unit 160 stores the driving duty of the light amount determined as the adjusting value in the storage unit 40. This enables the control unit 10 to read the driving duty stored in the storage unit 40 and drive the light source 112 by this driving duty, in image reading. This enables the image reading unit 100 to achieve image reading with a high SN ratio without causing the CCD saturation of the image sensor 121. However, the above-described AGC process is executed using a newly set light amount.

In this way, the image forming apparatus 1 according to the embodiment enables detecting not the largest saturated output voltage as the specification set for safety, but the status of CCD saturation of the image sensor 121 as an individual equipped in the image forming apparatus 1. This enables the image forming apparatus 1 to achieve sufficient use of the performance of the image sensor 121 as the individual and image reading with a high SN ratio.

The disclosure is executable not only in the embodiment described above but also in the following modifications.

Modification 1

Figure 7A:
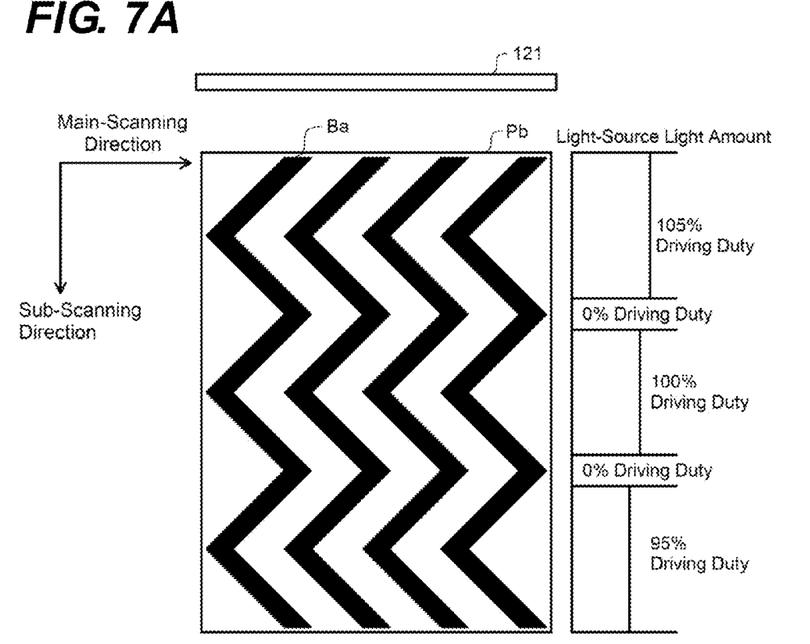
FIGS. 7A to 7B illustrate an adjustment document used for an adjustment process of a light amount of a light source and a reading status according to a modification.
Figure 7B:
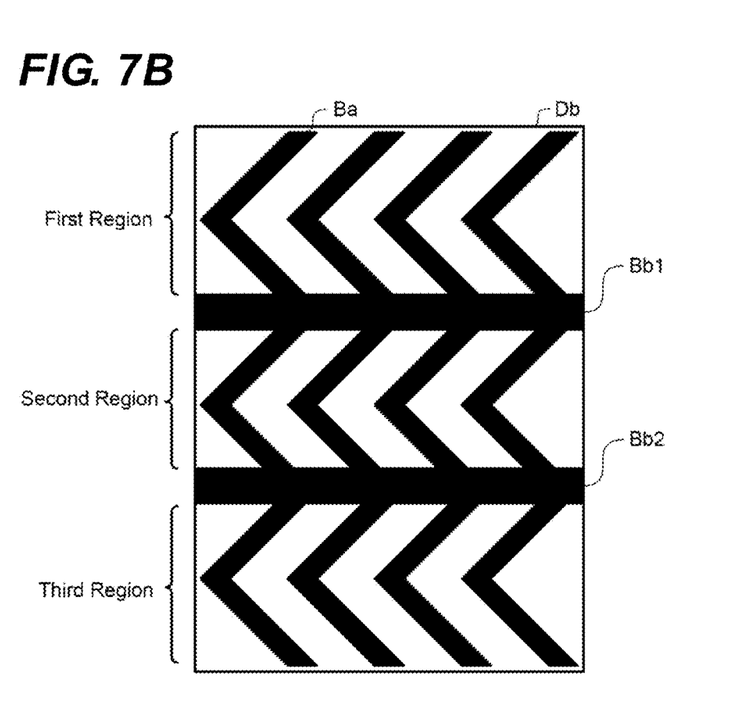

While in the above-described embodiment the light-amount limit for a part of the CCD elements (14 locations in the above-described embodiment) of the image sensor 121 is detected by detecting the contour (orthogonally intersecting the main-scanning direction) of the black band B in the sub-scanning direction, as illustrated, for example, in FIGS. 7A and 7B, the light-amount limit may be detected for all of or many of the pixels of the image sensor 121 using a black band that extends in a direction slantingly intersecting the main-scanning direction, which is a direction where a plurality of light receiving elements are arranged, as the test image.

FIGS. 7A and 7B illustrate an adjustment document Pb used for the adjustment process of the light amount of the light source 112 and a reading status according to the modification 1. FIG. 7A illustrates the adjustment document Pb, and FIG. 7B illustrates test image data Db generated by reading of the adjustment document Pb. In the adjustment document Pb of the modification 1, black bands Ba that extend oriented intersecting the sub-scanning direction are formed. Since the contour position of the black band Ba moves in the main-scanning direction as the image sensor 121 moves in the sub-scanning direction, it is possible to detect the light-amount limit across the plurality of pixels in this moving range.

Modification 2

While in the above-described embodiment the light-amount limit is detected by performing a plurality (three times) of scans where the light amounts are different with one another, the light-amount limit may be detected with a single scan by, for example, changing the light amount during sub-scanning. Specifically, for example, during the sub-scanning of the image sensor 121, as illustrated in FIG. 7A, the light source 112 may be driven by causing the driving duty to change in order of 105% driving duty, 0% driving duty, 100% driving duty, 0% driving duty, and 95% driving duty. This enables the image reading unit 100 to generate the test image data Db as illustrated in FIG. 7B.

The test image data Da has three regions divided in the sub-scanning direction, namely, a first region, a second region, and a third region. The first region, the second region, and the third region are image regions formed by the light from the light source 112 that is driven at 105% driving duty, 100% driving duty, and 95% driving duty, respectively. Between the first region and the second region, a black boundary region Bb1 is formed. The boundary region Bb1 is a region formed at 0% driving duty to clearly partition the first region and the second region. A boundary region Bb2 is a region formed at 0% driving duty to clearly partition the second region and the third region.

Modification 3

Figure 8A:
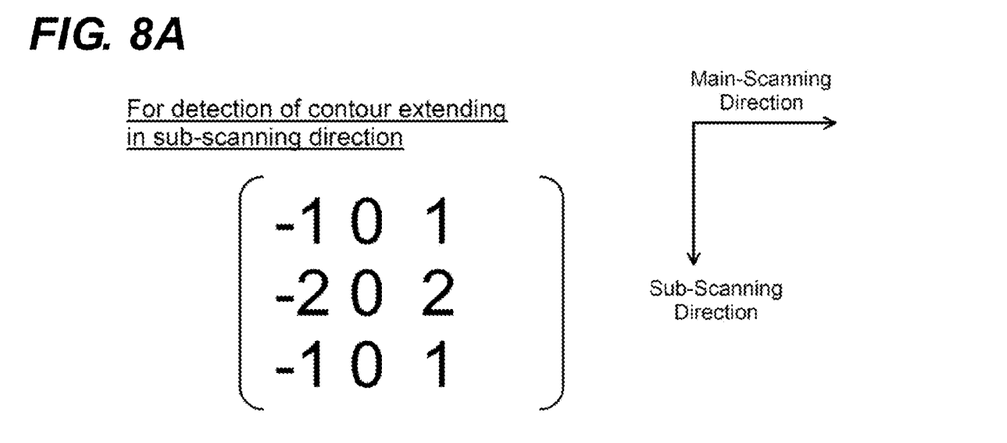
FIGS. 8A to 8C illustrate an exemplary contour detection filter according to a modification.
Figure 8B:
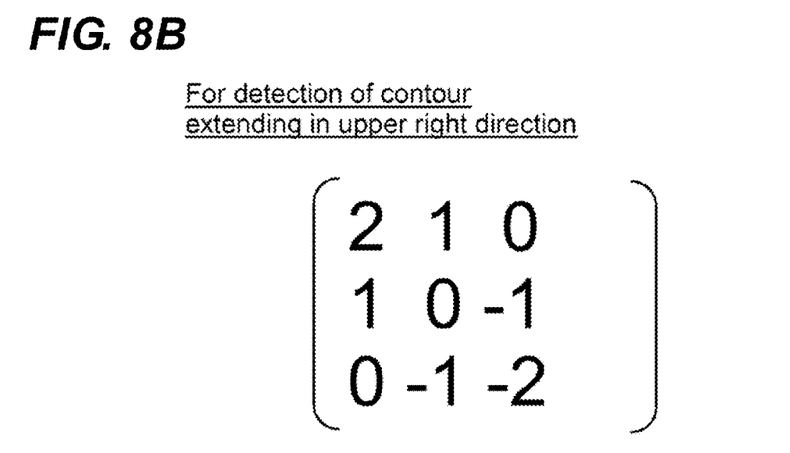
Figure 8C:
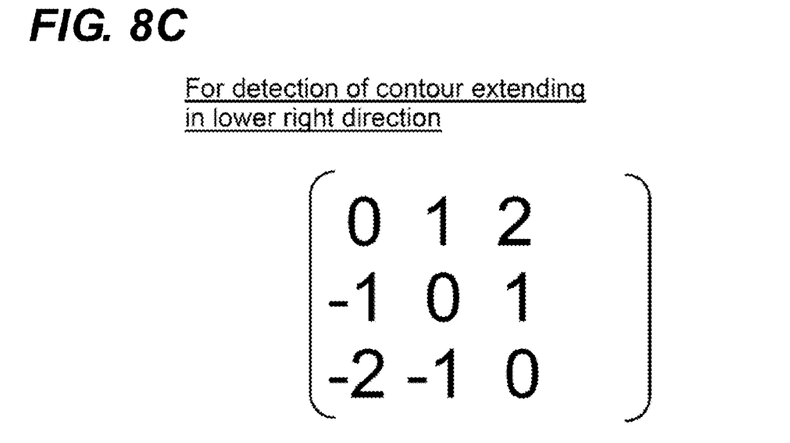

While in the above-described embodiment a contour detection is performed using the differential filter, a Sobel filter or other filter as illustrated, for example, in FIGS. 8A to 8C may be used. In the process proceeding toward the main-scanning direction, FIG. 8A illustrates a Sobel filter that is appropriate for detection of a contour extending in the sub-scanning direction and is preferable for the detection of the black band B illustrated in FIG. 4A.

In the process proceeding toward the upper left direction in FIGS. 7A and 7B, FIG. 8B illustrates a Sobel filter that is appropriate for detection of a contour extending in the upper right direction. In the process proceeding toward the lower left direction in FIGS. 7A and 7B, FIG. 8C illustrates a Sobel filter that is appropriate for detection of a contour extending in the lower right direction. Two Sobel filters illustrated in FIGS. 8B and 8C are Sobel filters that are preferable for detection of the black band Ba that has a zigzag shape (inclining at 45 degrees with respect to the main-scanning direction) illustrated in FIGS. 7A and 7B.

Modification 4

While in the above-described embodiment the light-amount limit is detected by reading the image of the adjustment document, a light-amount-adjustment reference plate that is a reference plate, for example, like the white reference plate 132 (see FIG. 1) and includes a black band may be arranged in the proximity of the white reference plate 132. This enables automatic adjustment even during operation without dependence on user's operation. Furthermore, the disclosure enables light-amount adjustment according to secular changes of an image sensor and is usable for detection of a failure of an image sensor.

Modification 5

While in the above-described embodiment the disclosure is applied to the image forming apparatus, the disclosure is also applicable to a scanner-only machine and other image reading apparatuses.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image reading apparatus for reading an image on a document, the image reading apparatus comprising:
   a light source that irradiates the document with light;
   a light-source control unit that controls amount of light from the light source;
   a line sensor that includes a plurality of light receiving elements, a plurality of charge coupled devices, and a shift register, the plurality of light receiving elements generating electric charges on receiving reflected light reflected from the light on the document, the plurality of charge coupled devices accumulating respective electric charges generated by the plurality of light receiving elements, and the shift register receiving electric charges transferred from the plurality of charge coupled devices;
   an image data generating unit that generates image data according to electric charges output from the shift register; and
   an image analysis unit that determines whether transfer of the electric charges is normal, based on a contour reproduction status, being the status of reproduction of contours in test image data generated by reading of a test image having contours oriented intersecting an orientation whereby the plurality of light receiving elements are arranged; wherein
   the light-source control unit adjusts the amount of light from the light source based on the determination by the image analysis unit.

2. The image reading apparatus according to claim 1, wherein:
   the image data generating unit generates a plurality of pieces of test image data by irradiating the test image with a plurality of test light amounts that are different with one another; and
   the image analysis unit determines the light amount of the light source using the test light amount closest to the test light amount used for generation of the test image data in which the transfer of the electric charge is determined to be not normal, among the test light amounts used for generation of at least one piece of the test image data in which the transfer of the electric charge is determined to be normal.

3. The image reading apparatus according to claim 1, wherein the image analysis unit determines that the transfer of the electric charge is normal when a difference of pixel values of two adjacent pixels that constitute the contour is equal to or more than a preset predetermined value.

4. The image reading apparatus according to claim 1, wherein the image analysis unit processes the image data with a predetermined contour detection filter and determines that the transfer of the electric charge is normal when a pixel value of a contour detected by the contour detection filter is equal to or more than a preset predetermined value.

5. The image reading apparatus according to claim 1, wherein the test image has a contour in a direction slantingly intersecting a direction where the plurality of light receiving elements are arranged.

6. The image reading apparatus according to claim 1, wherein the image data generating unit generates the plurality of pieces of test image data by repeating sub-scanning of the test image.

7. The image reading apparatus according to claim 1, wherein:
   the image data generating unit generates a plurality of pieces of image data in a status irradiated with the plurality of different test light amounts by changing the test light amount as a light amount for test, during the sub-scanning of the line sensor; and
   the image analysis unit sets the light amount using the test light amount used for reading of image data in which the test light amount is closest to an test light amount of image data in which the transfer of the electric charge is determined to be not normal, among at least one piece of image data in which the transfer of the electric charge is determined to be normal.

8. An image forming apparatus, comprising:
   the image reading apparatus according to claim 1; and
   an image forming unit that forms an image based on an image read by the image reading apparatus.

9. An image reading method for reading an image on a document, the image reading method comprising:
   irradiating the document with light;
   controlling amount of light from the light source;
   generating, by the plurality of light receiving elements, electric charges on receiving reflected light reflected from the light on the document;
   accumulating, by the plurality of charge coupled devices, respective electric charges generated by the plurality of light receiving elements;

receiving, by the shift register, electric charges transferred from the plurality of charge coupled devices;

generating image data according to electric charges output from the shift register; and determining whether transfer of the electric charges is normal, based on a contour reproduction status, being the status of reproduction of contours in test image data generated by reading of a test image having contours oriented intersecting an orientation whereby the plurality of light receiving elements are arranged; wherein the controlling includes adjusting the amount of light from the light source based on the determination by the determining.

10. A non-transitory computer-readable recording medium storing a control program to control an image reading apparatus for reading an image on a document, the control program causing the image reading apparatus to function as:

a light source that irradiates the document with light;

a light-source control unit that controls amount of light from the light source;

a line sensor that includes a plurality of light receiving elements, a plurality of charge coupled devices, and a shift register, the plurality of light receiving elements generating electric charges on receiving reflected light reflected from the light on the document, the plurality of charge coupled devices accumulating respective electric charges generated by the plurality of light receiving elements, and the shift register receiving electric charges transferred from the plurality of charge coupled devices;

an image data generating unit that generates image data according to electric charges output from the shift register; and an image analysis unit that determines whether transfer of the electric charges is normal, based on a contour reproduction status, being the status of reproduction of contours in test image data generated by reading of a test image having contours oriented intersecting an orientation whereby the plurality of light receiving elements are arranged; wherein the light-source control unit adjusts the amount of light from the light source based on the determination by the image analysis unit.

* * * * *